United States Patent [19]
Pennig

[11] 3,762,161
[45] Oct. 2, 1973

[54] GAS TURBINE FOR THE DRIVE OF MOTOR VEHICLES

[75] Inventor: Gregor Pennig, Karlsfeld, Munich, Germany

[73] Assignee: Daimler-Benz Aktiengesellschaft, Stuttgart-Unterturkheim, Germany

[22] Filed: Feb. 4, 1971

[21] Appl. No.: 112,741

[30] Foreign Application Priority Data
Feb. 11, 1970 Germany.................. P 20 06 138.5

[52] U.S. Cl. ............................. 60/39.16, 60/52 B
[51] Int. Cl. ............................................. F02c 3/06
[58] Field of Search .................. 60/39.16, 52 B, 51, 60/39.14

[56] References Cited
UNITED STATES PATENTS

| | | | |
|---|---|---|---|
| 3,546,879 | 12/1970 | Hass.................................. | 60/39.16 |
| 3,465,162 | 9/1969 | Oprecht............................. | 60/39.14 |
| 3,488,947 | 1/1970 | Miller et al. .................... | 60/39.16 R |
| 3,104,529 | 9/1963 | Goss................................... | 60/52 B |
| 3,135,087 | 6/1964 | Ebert................................. | 60/52 B |
| 3,498,057 | 3/1970 | Kronogard et al............. | 60/39.16 R |
| 3,165,980 | 1/1965 | Peras................................. | 60/52 B |

FOREIGN PATENTS OR APPLICATIONS
540,183 10/1941 Great Britain ......................... 60/51

Primary Examiner—Carlton R. Croyle
Assistant Examiner—Warren Olsen
Attorney—Craig, Antonelli, Stewart & Hill

[57] ABSTRACT

A gas turbine for the drive of motor vehicles which includes a free output turbine adapted to be connected during braking with the compressor by way of a hydrostatic force-transmitting system consisting of a pump and of a motor, that is adapted to be selectively engaged and disengaged by filling and emptying the circulatory system thereof.

12 Claims, 1 Drawing Figure

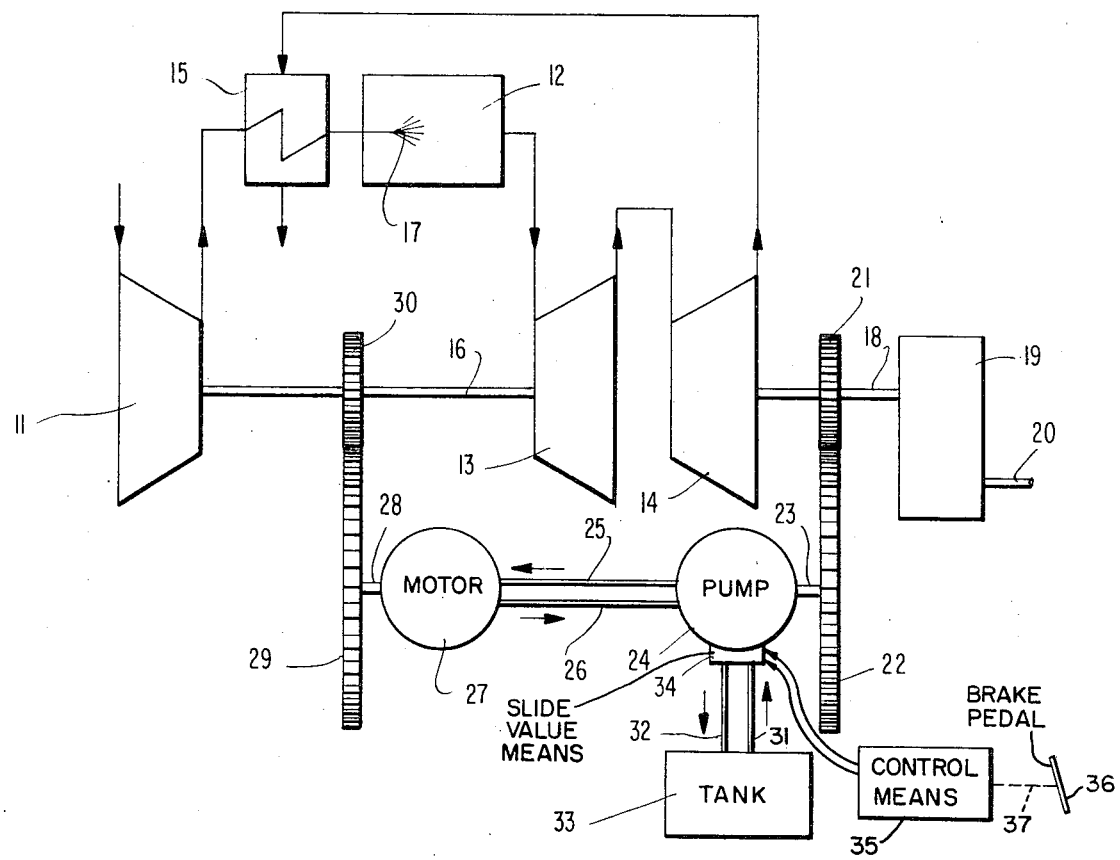

GAS TURBINE FOR THE DRIVE OF MOTOR VEHICLES

The present invention relates to gas turbines, and more particularly to gas turbines used for driving motor vehicles.

Gas turbines for the drive of motor vehicles entail the disadvantage with respect to piston internal combustion engines that the compressor thereof normally cannot take over any brake work since no direction connection exists from the driven wheels of the vehicle to the compressor. One has attempted to eliminate this shortcoming in that one connects the output or power turbine connected with the driven wheels with the compressor by way of a planetary gear. However, for that purpose the drive shaft of the planetary gear has to be extended through the shaft of the output turbine constructed as hollow shaft. A more costly construction involving a large number of parts results therefrom which additionally entails the disadvantage that the length of life of the bearings of the output turbine is shortened. Another possibility resides in connecting the output turbine with the compressor by way of a shaft (counter shaft) disposed parallel to the common axis thereof. By reason of the large spacing to be bridged thereby, a very long shaft is necessary which requires additional space and necessitates an expensive bearing support.

The present invention relates to such a type of gas turbine for the drive of motor vehicles with a free output or work turbine which is adapted to be connected with the compressor during the braking operation. More particularly, the present invention is concerned with the task to avoid the aforementioned disadvantages and to provide a gas turbine which, without large structural expenditures, can be utilized effectively for the braking of a vehicle. This is realized by a hydrostatic force transmission consisting of a pump and of a motor from the output turbine to the compressor, which is selectively engaged or disengaged by filling and emptying of its circulatory system. In lieu of rigid mechanical transmission elements, only fluid lines are necessary in the present invention which can be easily adapted to the spatial conditions of the gas turbine and of the motor vehicle.

According to a further advantageous construction of the present invention, the output turbine is connected with the pump by a gear wheel drive and the motor is connected with the compressor also by a gear wheel drive. This enables a favorable reduction of the rotational speed of the hydraulic drive and a still more free, spatial accommodation of the hydraulic structural elements since these structural elements need not possess common axes.

Accordingly, it is an object of the present invention to provide a gas turbine for the drive of motor vehicles which avoids by simple means the aforementioned shortcomings and drawbacks encountered in the prior art.

Another object of the present invention resides in a gas turbine for the drive of motor vehicles which can be utilized to assume brake work without requiring expensive connections involving a large number of parts.

A further object of the present invention resides in a gas turbine for the drive of motor vehicles, capable of assuming a brake function during braking of the vehicle which not only does not shorten the length of life of the bearings of the output turbine but additionally permits a favorable space utilization in the vehicle.

Another object of the present invention resides in a gas turbine for the drive of motor vehicles capable of assuming brake work during braking of the vehicle which does not require any substantial additional space, yet does not involve large numbers of costly parts.

These and further objects, features and advantages of the present invention will become more obvious from the following description when taken in conjunction with the accompanying drawing which shows, for purposes of illustration only, one embodiment in accordance with the present invention, and wherein:

The single FIGURE is a schematic view of a gas turbine for the drive of a motor vehicle in accordance with the present invention.

Referring now to the single figure of the drawing, the gas turbine for the drive of a motor vehicle in accordance with the present invention essentially consists of a compressor 11, of a combustion chamber 12, of a high-pressure turbine 13, of a low-pressure turbine 14 and of a heat-exchanger 15.

The compressor 11 is driven by the high-pressure turbine 13 by way of a shaft 16. The compressor 11 supplies compressed air which absorbs heat from the exhaust gases in the heat-exchanger 15. The compressed and pre-heated air is fed to the combustion chamber 12, within which fuel injected through a nozzle 17 is combusted. The hot expanding combustion gases flow successively through the high-pressure turbine 13 and the low-pressure turbine 14 whose rotors are set into rotation thereby. Prior to discharge into the atmosphere, the exhaust gases are conducted through the heat-exchanger 15.

The low-pressure turbine 14 is constructed in the usual manner as free output or work turbine which is connected by way of a shaft 18 with a speed-reduction gear 19 whose output shaft 20 transmits the torque to the driven wheels (not shown) of the motor vehicle. A spur gear 21 is secured on the shaft 18 which meshes with a spur gear 22 which, in turn, drives a vane-type pump 24 by way of a shaft 23. The vane-type pump 24 is connected with a vane-type motor 27 by way of a feed line 25 and a return line 26. A spur gear 29 is secured on the shaft 28 of the vane-type motor 27 which meshes with a spur gear 30 that, in turn, is secured on the shaft 16 between the compressor 11 and the high-pressure turbine 13.

For filling and emptying the hydraulic circulatory system of the rotary vane-type pump 24 and of the rotary vane-type motor 27, a feed line 31 and a discharge line 32 lead from the vane-type pump 24 to a tank 33 for the hydraulic liquid. The vane-type pump 24 can be selectively connected by means of a conventional slide valve 34 either with the feed line 31 or with the discharge line 32.

During the braking of the motor vehicle, the fuel supply to the combustion chamber 12 is reduced to a minimum value or is completely interrupted. If the gas turbine is to be utilized for the purposes of braking, then liquid is drawn-in by the vane-type pump 24 through the feed line 31 and is fed into the feed line 25 until the circulator system is filled which requires only a very short period of time. The vane-type motor 27 is now driven from the vehicle wheels by way of the speed-reduction gear 19, the spur gear pair 21/22 and the vane-type pump 24 with associated hydraulic system and in its turn drives the compressor 11 by way of the spur gear pair 29/30. The compressor work absorbed thereby is effective as brake work at the driven wheels and decelerates the vehicle. Since the braking power of the compressor 11 is approximately as large as the useful output power of the low-pressure turbine 14 for the drive of the vehicle, a considerable deceleration of the vehicle is made possible thereby.

For purposes of terminating the braking, the rotary vane-type pump 24 is connected by means of the slide valve 34 with the discharge line 32 so that the circulatory system is emptied of its liquid except for a small residual amount for the removal of heat and the lubrication of the pump and motor. The force transmission from the driven wheels to the compressor 11 is thereby interrupted. The vane-type pump 24 now merely rotates along without load, i.e., merely idles along and thus absorbs practically now power.

The rotary vane-type pump 24 of any conventional construction operates, for example, with rotational speeds up to about 20,000 r.p.m. and produces pressures up to about 500 atmospheres excess pressure whence very small dimensions and very good efficiencies of the force transmission can be attained. In lieu of a rotary vane-type pump and vane-type motor, also other hydrostatic drives, for example, axial piston devices can be utilized. The filling and emptying can take place at will by the drive, for example, by closing of the energizing circuit of an electromagnet acting on a valve forming a control means 35 for the slide valve means or by actuating the control means in dependence on the position of the brake lever 36, for example, by a linkage 37 therebetween. The control can also take place by means of a linkage between a brake pedal and a valve of the hydrostatic circulatory system.

While I have shown and described only one embodiment in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

What I claim is:

1. A braking arrangement for a motor vehicle driven by a turbine engine of the type having a rotatable compressor means and a rotatable work turbine means, said work turbine means being independently rotatable with respect to said compressor means during normal drive of the vehicle, said work turbine means being in driving engagement with an output shaft for driving said vehicle; said arrangement comprising: selectively engageable braking transmission means for transmitting braking forces from said compressor means to said work turbine means, and a selectively actuable brake control means for controlling the engagement of said transmitting means wherein said braking transmission means includes a hydrostatic coupling means for coupling said compressor means with said work turbine means only when said brake control means is actuated.

2. A braking arrangement according to claim 1, wherein said hydrostatic coupling includes a pump means, a motor means, a circulatory system operatively connecting said pump means and said motor means and means responsive to the actuation of said brake control means for filling and emptying said circulatory system for selectively engaging and disengaging said pump and motor.

3. A gas turbine according to claim 2, further including gear means for connecting said work turbine means with said pump and gear for connecting said means compressor means with said motor means.

4. A gas turbine according to claim 3, wherein each of said gear means consists of a pair of spur gears providing a speed reduction from said work turbine means and compressor means to said braking transmission means.

5. A gas turbine according to claim 4, wherein said means for filling and emptying said circulatory system includes a slide valve means for selectively connecting said circulatory system with a tank.

6. A gas turbine according to claim 5, wherein said slide valve means operably connects said pump means with a feed line from said tank during braking and with a discharge line during normal operation when the braking is terminated.

7. A gas turbine according to claim 6, wherein said means for filling and emptying said circulatory system further includes means for electromagnetically actuating said slide valve means.

8. A gas turbine according to claim 7, wherein said brake control means includes a brake pedal, said slide valve means being actuated in dependence on the position of said brake pedal.

9. A gas turbine according to claim 2, wherein said means for filling and emptying of said circulatory system includes a slide valve means for selectively connecting said circulatory system with a tank.

10. A gas turbine according to claim 9, wherein said slide valve means operably connects said pump means with a feed line from said tank during braking and with a discharge line during normal operation when the braking is terminated.

11. A gas turbine according to claim 9, wherein said means for filling and emptying said circulatory system further includes means for electromagnetically actuating said slide valve means.

12. A gas turbine according to claim 9, wherein said brake control means includes a brake pedal, said slide valve means being actuated in dependence on the position of a brake pedal.

* * * * *